United States Patent
Aota

(10) Patent No.: US 9,086,543 B2
(45) Date of Patent: Jul. 21, 2015

(54) POLARIZATION ELEMENT AND METHOD OF MANUFACTURING POLARIZATION ELEMENT

(71) Applicant: SEIKO EPSON CORPORATION, Tokyo (JP)

(72) Inventor: Masaaki Aota, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 13/839,241

(22) Filed: Mar. 15, 2013

(65) Prior Publication Data

US 2013/0250412 A1   Sep. 26, 2013

(30) Foreign Application Priority Data

Mar. 23, 2012   (JP) .................. 2012-066922

(51) Int. Cl.
    *G02B 5/30*   (2006.01)
(52) U.S. Cl.
    CPC .................. *G02B 5/3058* (2013.01)
(58) Field of Classification Search
    CPC .................................................. G02B 5/3058
    USPC .......................... 359/485.05, 487.03; 216/24
    See application file for complete search history.

(56) References Cited

U.S. PATENT DOCUMENTS

2005/0128587 A1*   6/2005   Suganuma .................... 359/486
2010/0225832 A1*   9/2010   Kumai .............................. 349/8

FOREIGN PATENT DOCUMENTS

JP   2007-017762   1/2007

* cited by examiner

*Primary Examiner* — Frank Font
(74) *Attorney, Agent, or Firm* — Workman Nydegger

(57) ABSTRACT

A polarization element includes a plurality of metallic thin lines that extend in one direction on one surface of a substrate, a protecting layer that is provided on the plurality of metallic thin lines, and a cavity portion that is surrounded by two metallic thin lines which are adjacent to each other, the substrate, and the protecting layer. Each end portion of the plurality of metallic thin layers has a forward tapered shape in a cross-section parallel to the one direction, and the protecting layer extends from the upper portion of the plurality of metallic thin lines to the one surface of the substrate through each end portion.

15 Claims, 8 Drawing Sheets

US 9,086,543 B2

POLARIZATION ELEMENT AND METHOD OF MANUFACTURING POLARIZATION ELEMENT

BACKGROUND

1. Technical Field

The present invention relates to a polarization separating element which is generally called a wire grid polarization element.

2. Related Art

A wire grid polarization element has a configuration in that a grid formed of metal is laid on a transparent substrate. The biggest property of the wire grid polarization element is that the pitch of the grid is sufficiently shorter than a wavelength being used.

Since the wire grid polarization element is configured of only inorganic materials, degradation due to heat does not frequently occur, compared to a polarization element using organic materials. However, since a projector obtains a higher brightness year on year, high temperature reliability of an inorganic polarization element which is disposed on a light path thereof becomes a problem due to an increase in temperatures.

As a result of an investigation, it is determined that degradation in an optical property measured when the inorganic polarization element is held at a high temperature, is due to a thermally-oxidized film which grows on a surface of the metallic grid (in general, aluminum is used).

As a technology for protecting the metallic grid, JP-A-2007-17762 discloses that a protecting layer is provided on the metallic grid with an obliquely film-forming method. According to JP-A-2007-17762, a cavity portion is formed by two metallic thin lines which are adjacent to each other, a substrate, and a protecting layer.

However, when the protecting layer is formed with a method disclosed in JP-A-2007-17762, since an end portion of the cavity portion is not covered by the protecting layer, oxygen is supplied to the inside of the cavity portion from the end portion of the cavity portion. Thus, there is a concern that the metallic grid is oxidized in a high-temperature environment.

SUMMARY

An advantage of some aspects of the invention is to solve at least a part of the problems described above, and the invention can be implemented as the following forms or application examples.

Application Example 1

This application example is directed to a polarization element including: a plurality of metallic thin lines that extend in one direction on one surface of a substrate; a protecting layer that is provided on the plurality of metallic thin lines; and a cavity portion that is surrounded by two metallic thin lines which are adjacent to each other among the plurality of metallic thin lines, the substrate, and the protecting layer, wherein each end portion of the plurality of metallic thin layers has a forward tapered shape in a cross-section parallel to the one direction, and the protecting layer extends from the upper portion of the plurality of metallic thin lines to the one surface of the substrate through each end portion of the plurality of metallic thin lines.

According to this application example, each end portion of the plurality of metallic thin lines has a forward tapered shape in a cross-section parallel to the extending direction, and the protecting layer extends from the upper portion of the plurality of metallic thin lines to the one surface of the substrate through each end portion of the plurality of metallic thin lines. Thus, the space between two metallic thin lines which are adjacent to each other among the plurality of metallic thin lines becomes the cavity portion which is surrounded by the two metallic thin lines which are adjacent to each other, the substrate, and the protecting layer. Since oxygen is difficult to supply to the inside of the cavity portion from the outside of the cavity portion, when the metallic thin lines are exposed to a high-temperature environment, although they are initially oxidized, it is gradually less likely to be oxidized. Accordingly, metallic thin lines are not likely to be oxidized when exposed to a high-temperature environment and it is possible to provide a polarization element with superior high-temperature reliability in which the property degradation is suppressed.

Application Example 2

This application example is directed to the polarization element according to the application example described above, wherein an oxygen concentration of the cavity portion is lower than the oxygen concentration outside the cavity portion.

According to this application example, since an amount of oxygen in the cavity is small, initial oxidization of metallic thin lines is not likely to occur, when the metallic thin lines are exposed to a high-temperature environment. Thus, it is possible to provide a polarization element with superior high-temperature reliability in which the property degradation is suppressed.

Application Example 3

This application example is directed to the polarization element according to the application example described above, wherein an inert gas is hermetically filled in the cavity portion.

According to this application example, it is possible to set the oxygen concentration in the cavity to be low, without keeping atmospheric pressure in the cavity in a lower state compared to atmospheric pressure outside the cavity. Accordingly, damage to the protecting layer due to the difference in atmospheric pressure between the inside and outside a cavity is suppressed and thus, it is possible to provide a polarization element with superior high-temperature reliability in which the property degradation is suppressed.

Application Example 4

This application example is directed to the polarization element according to the application example described above, wherein the plurality of metallic thin lines and the plurality of cavity portions are sealed by the protecting layer and the substrate.

According to this application example, since the plurality of metallic thin lines and the plurality of cavity portions are sealed by the protecting layer and the substrate, oxygen is not supplied to the inside of the cavity portion from the outside of the cavity portion. Thus, when the metallic thin lines are exposed to a high-temperature environment, although they are oxidized only initially, the oxidization stops with the oxygen depletion. Accordingly, oxidization of metallic thin lines is not likely to occur when the metallic thin lines are exposed to a high-temperature environment and thus, it is possible to provide a polarization element with superior high-temperature reliability in which the property degradation is suppressed.

Application Example 5

This application example is directed to a method of manufacturing a polarization element including a plurality of metallic thin lines that extend in one direction on one surface of a substrate, a protecting layer that is provided on the plurality of metallic thin lines, and a cavity portion that is surrounded by two metallic thin lines which are adjacent to each other among the plurality of metallic thin lines, the substrate, and the protecting layer, wherein each end portion of the plurality of metallic thin lines has a forward tapered shape in a cross-section parallel to the one direction. The method includes: forming a metallic film on the one surface of the substrate; forming a striped resist pattern on the metallic film; etching the metallic film with the striped resist pattern as a mask to form the plurality of metallic thin lines; and forming the protecting layer on the plurality of metallic thin lines, wherein, in the forming of the metallic film, the metallic film is formed so that an end portion of the metallic film has a forward tapered shape, and in the forming of the protecting layer, the protecting layer is formed so that the cavity portion surrounded by the two metallic thin lines, the substrate and the protecting layer is formed.

According to this application example, the forming of the metallic film and the forward tapered shape process of the end portion of the metallic film are performed at the same time. In addition, since each end portion of the plurality of metallic thin lines has a forward tapered shape, the protecting layer is continuously guided to the one surface of the substrate from the upper portion of the plurality of metallic thin lines and upper side of the plurality of cavity portions through the forward tapered shaped portion. Accordingly, it is easy to set a space between two metallic thin lines which are adjacent to each other among the plurality of metallic thin lines as the cavity portion surrounded by the two metallic thin lines which are adjacent to each other, the substrate, and the protecting layer. Thus, it is possible to easily form a polarization element with superior high-temperature reliability in which oxidization of metallic thin lines is not likely to occur when the metallic thin lines are exposed to a high-temperature environment, and the property degradation is suppressed, without undergoing complicated processes.

Application Example 6

This application example is directed to the method of manufacturing a polarization element according to the application example described above, wherein in the forming of the protecting layer, the protecting layer is obliquely vapor-deposited from a direction which intersects with the one direction and which is oblique with respect to a normal line of the one surface of the substrate.

According to this application example, it is easy to set a space between two metallic thin lines which are adjacent to each other among the plurality of metallic thin lines as the cavity portion surrounded by the two metallic thin lines which are adjacent to each other, the substrate, and the protecting layer.

Application Example 7

This application example is directed to the method of manufacturing a polarization element according to the application example described above, wherein in the forming of the metallic film, the metallic film is vapor-deposited on the one surface of the substrate with a mask that is provided between a film source and the substrate so that the end portion of the metallic film has a forward tapered shape.

According to this application example, it is easily possible that the end portion of the metallic film has a forward tapered shape.

Application Example 8

This application example is directed to a projector including the polarization element according to any of the application examples described above.

According to this application example, it is possible to realize a projector including a polarization optical system which is excellent in display quality and reliability.

Application Example 9

This application example is directed to an electronic device including the polarization element according to any of the application examples described above.

According to this application example, it is possible to realize an electronic device including a polarization optical system which is excellent in display quality and reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the embodiments of the invention will be described with reference to the drawings. The drawings used in the description below are appropriately enlarged and reduced in size so that each of members is recognizable.

First Embodiment

Figure 1A:
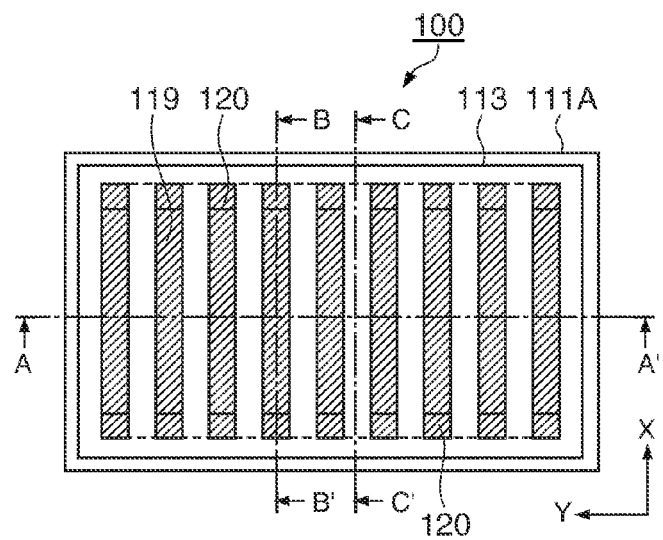
FIGS. 1A to 1D are views showing a polarization element according to a first embodiment.
Figure 1B:
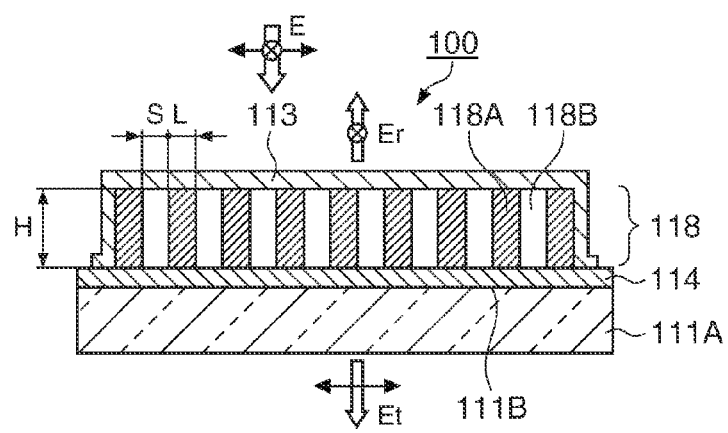
Figure 1C:
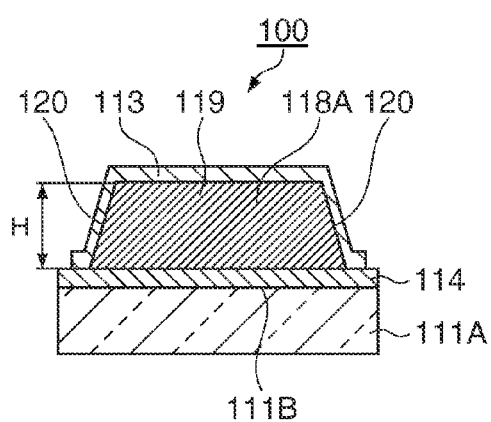
Figure 1D:
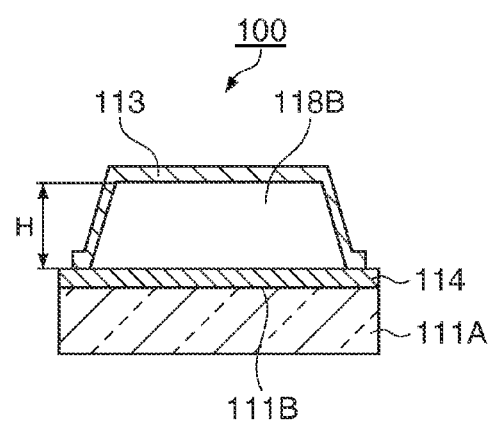

First, a polarization element 100 of the embodiment will be described with reference to FIGS. 1A to 1D. Herein, FIG. 1A is a plane view showing the polarization element 100 of the embodiment, FIG. 1B is a cross-sectional view taken along a line A-A' of FIG. 1A and an explanatory diagram of an operation of the polarization element, FIG. 1C is a cross-sectional view taken along a line B-B' of FIG. 1A, and FIG. 1D is a cross-sectional view taken along a line C-C' of FIG. 1A.

As shown in FIGS. 1A to 1D, the polarization element 100 is a light reflective polarization element, and includes a substrate 111A, a wire grid polarization layer 118 formed on a ground layer 114 which covers a surface 111B of the substrate 111A, and a protecting layer 113 which is provided on the surface 111B of the substrate 111A through the wire grid polarization layer 118.

The substrate 111A is formed of a transparent substrate such as glass, quartz, and plastic, and when the polarization element 100 is a reflective type, an opaque substrate such as a metallic substrate or a ceramic substrate may be used.

In addition, the ground layer 114 is formed on the surface 111B of the substrate 111A as necessary, and can be formed by a silicon oxide film or an aluminum oxide film, for example. The ground layer 114 includes a function of preventing damage to the substrate 111A due to etching or the like, and a function of improving adhesiveness of metallic thin lines 118A with respect to the substrate 111A, when performing a pattern formation of the metallic thin lines 118A by etching. In addition, when forming a reflective polarization element as the polarization element 100, the ground layer 114 may be formed by a light reflective metallic material.

The wire grid polarization layer 118 includes the plurality of metallic thin lines 118A which are disposed in a striped manner with predetermined intervals. The wire grid polarization layer 118 is provided on the ground layer 114. The plurality of metallic thin lines 118A is formed to have a striped pattern in a plan view. For example, a width L of the metallic thin line 118A is about 70 nm, a height H of the metallic thin line 118A is about 150 nm, and a space S between the two metallic thin lines 118A which are adjacent to each other is about 70 nm. The height H is set to be equal to or less than 150 nm.

Herein, a ratio L/S defined with the width L and the space S of the metallic thin line 118A is an important parameter for determining optical properties of the polarization element 100. As shown in FIG. 1B, since the plurality of metallic thin lines 118A which is formed with a narrower pitch (about 140 nm) than a wavelength of visible light are provided, polarization selection is performed depending on polarization directions of light incident to the polarization element 100. In detail, linear polarized light Et including a polarizing axis in a direction perpendicular to an extending direction (X axis direction of FIG. 1A) of the metallic thin line 118A is transmitted, however linear polarized light Er including a polarizing axis in a direction parallel to the extending direction of the metallic thin line 118A is reflected. Accordingly, the polarization element 100 of the embodiment includes a reflective axis which is parallel to the extending direction of the metallic thin line 118A and a transmission axis with a direction (Y axis direction of FIG. 1A) perpendicular to the reflective axis.

As shown in FIG. 1C, in a cross-section parallel to the X axis direction, an end portion 120 of the metallic thin line 118A has a forward tapered shape. For the sake of convenience, in the present specification, a portion with the exception of the end portion 120 from the metallic thin line 118A is referred to as a flat portion 119 of the metallic thin line 118A. An effective region to be used as the polarization element 100 is a region in which the flat portion 119 is formed on the metallic thin line 118A, and the end portion 120 of the metallic thin line 118A is formed outside the effective region to be used.

Figure 5:
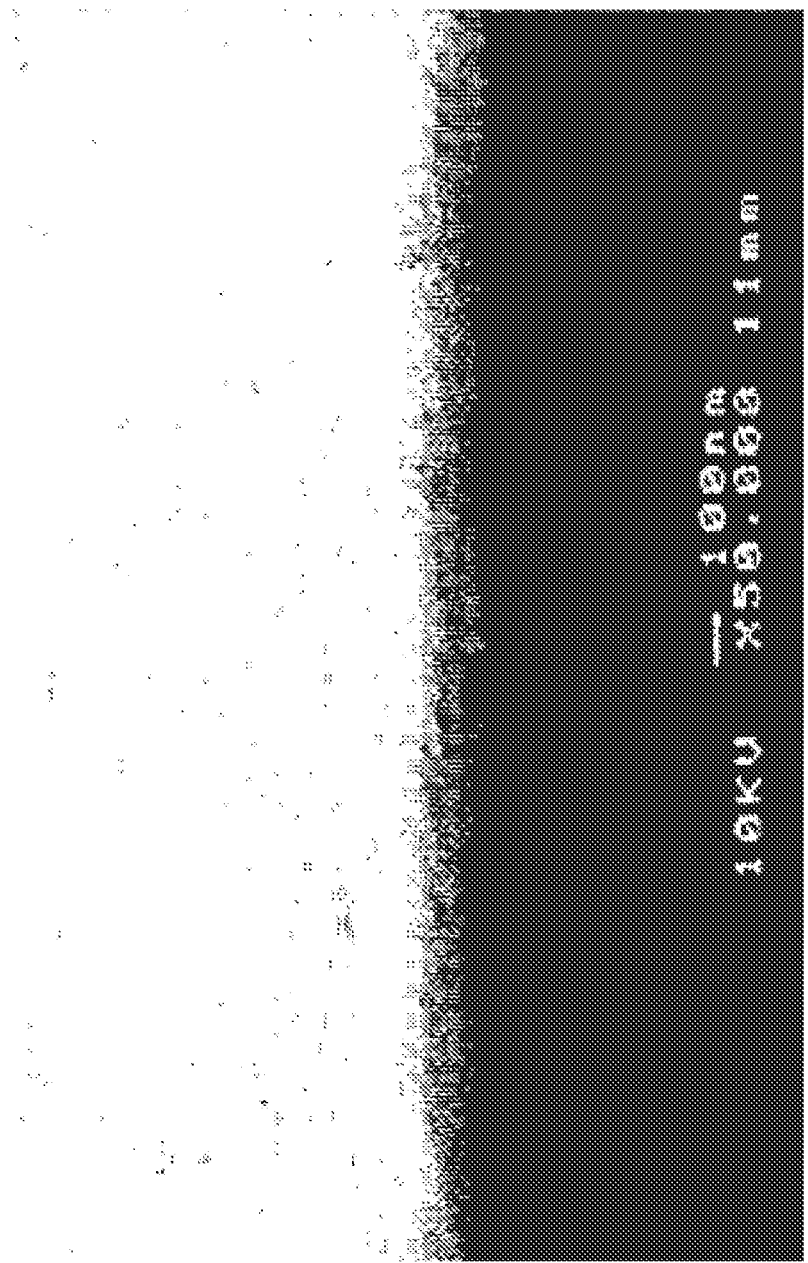
FIG. 5 is a view showing a crystalline structure of a protecting layer.

The protecting layer 113 is provided on the plurality of metallic thin lines 118A. The protecting layer 113 is a dielectric layer which is formed of a dielectric material such as $SiO_2$ or $MgF_2$. As will be described later, the protecting layer 113 is formed with an oblique film forming method, and includes a needle-like crystalline structure which is obliquely oriented (see FIG. 5).

As shown in FIGS. 1A to 1D, the protecting layer 113 extends from the upper portion of the plurality of metallic thin lines 118A, that is, the upper surface of the flat portion 119, to the surface 111B of the substrate 111A, through each end portion of the plurality of metallic thin lines 118A. As described above, the protecting layer 113 is provided on the upper surface of the end portion 120 and also in a region of the surface of the ground layer 114 that leads to the end portion 120. Further, as shown in FIGS. 1A, 1B, and 1D, the protecting layer 113 is also provided on an upper side of a cavity portion 118B. Thus, a space between two metallic thin lines 118A which are adjacent to each other among the plurality of metallic thin lines 118A is set as the cavity portion 118B which is surrounded by the two metallic thin lines 118A which are adjacent to each other, the substrate 111A (ground layer 114), and the protecting layer 113.

It is preferable for the plurality of metallic thin lines 118A and the plurality of cavity portions 118B to be sealed by the protecting layer 113 and the substrate 111A (ground layer 114). According to this, since oxygen is not supplied to the inside of the cavity portion 118B from the outside of the cavity portion 118B, when the metallic thin lines 118A are exposed to a high-temperature environment, although it is oxidized only initially, the oxidization stops with the oxygen depletion. Accordingly, the oxidization of the metallic thin lines 118A is not likely to occur when the metallic thin lines 118A are exposed to the high-temperature environment and thus, it is possible to provide a polarization element with superior high-temperature reliability in which the property degradation is suppressed.

In addition, it is not necessary for the plurality of metallic thin lines 118A and the plurality of cavity portions 118B to be sealed by the protecting layer 113 and the substrate 111A (ground layer 114). As long as the cavity portion 118B is surrounded by the two metallic thin lines 118A which are adjacent to each other, the substrate 111A (ground layer 114), and the protecting layer 113 so that the supply of the oxygen to the cavity portions 118B is sufficiently suppressed, the process of the oxidization of the metallic thin lines 118A is slowed down to obtain an effect of suppressing the property degradation.

It is preferable that the oxygen concentration of the cavity portions 118B is maintained to be lower than the oxygen concentration in the outside of the space formed by the protecting layer 113 and the substrate 111A (ground layer 114). For this, gas such as an inert gas for example, argon or nitrogen may be hermetically filled in the cavity portion 118B. An amount of the hermetically filled gas is not particularly limited, and may be in a state closer to a full vacuum state. However, when the gas such as the inert gas is hermetically filled in the cavity portion 118B, it is possible to suppress the oxygen concentration of the cavity portion 118B to be low, without keeping the atmospheric pressure of the inside of the cavity portion 118B in a lower state compared to the atmospheric pressure of the outside of the cavity portion 118B. Accordingly, damage to protecting layer 113 due to the difference in atmospheric pressure between inside and outside of the cavity portion 118B is suppressed and thus, it is possible to provide a polarization element with superior high-temperature reliability in which the property degradation is suppressed.

As described above, in the polarization element 100 of the embodiment, it is possible to prevent the oxygen from being supplied from the outside of the cavity portion 118B to the inside of the cavity portion 118B. Alternatively, it is possible to suppress the amount of the oxygen supplied to the inside of the cavity portion 118B to be an extremely small amount, by making the oxygen be difficult to supply from the outside of the cavity portion 118B to the inside of the cavity portion 118B. Accordingly, the oxidization of the metallic thin lines 118A when the polarization element 100 is exposed to a high-temperature environment can be suppressed. Thus, it is possible to improve the high-temperature reliability of the polarization element 100.

Method of Manufacturing Polarization Element

Figure 2:
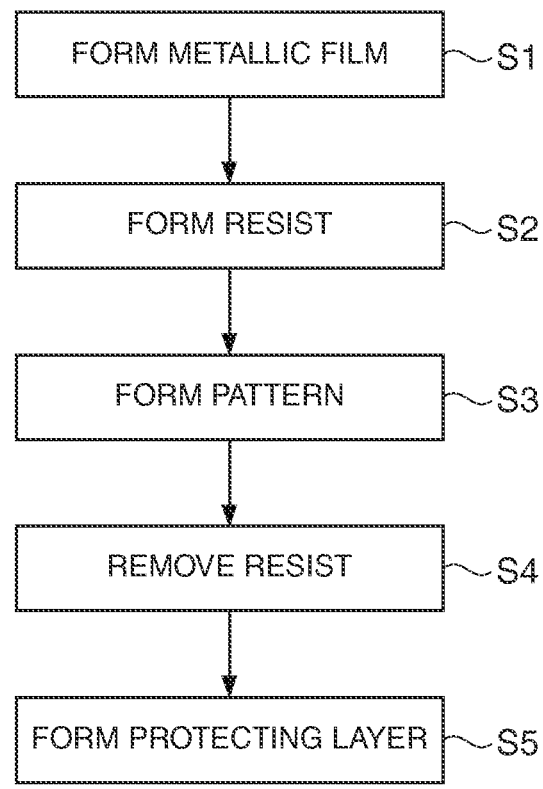
FIG. 2 is a flowchart showing a manufacturing step of a polarization element according to a first embodiment.

Next, a method of manufacturing the polarization element 100 described above will be described with reference to FIGS. 2 to 4E. Herein, FIG. 2 is a flowchart showing a manufacturing step of the polarization element 100, and FIGS. 3A to 3E are schematic views showing the manufacturing step of the polarization element and are cross-sectional views taken along lines A-A' of FIG. 1A. FIGS. 4A to 4E are schematic views showing the manufacturing step of the polarization element 100 and are cross-sectional views taken along lines B-B' of FIG. 1A.

Hereinafter, the method of manufacturing the polarization element will be described with reference to the flowchart of FIG. 2.

Figure 3A:
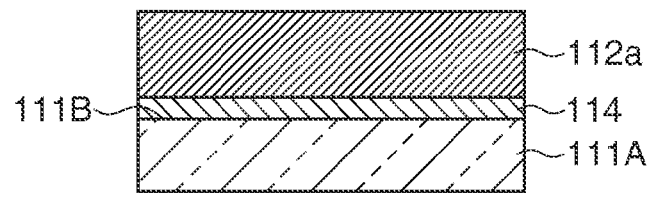
FIGS. 3A to 3E are views showing a manufacturing step of a polarization element according to a first embodiment.

First, in a metallic film forming step S1, as shown in FIG. 3A, for example, a silicon oxide film is formed on the surface 111B of the substrate 111A which is formed of a translucent material such as glass, quartz, or plastic, by a vapor-deposition method such as a sputtering method or the like, to be set as the ground layer 114. After that, aluminum (Al) film is formed on the ground layer 114 using the vapor-deposition method such as the sputtering method to form a metallic film 112a.

Figure 4A:
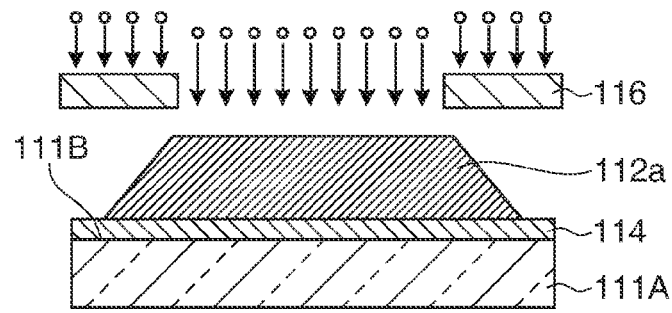
FIGS. 4A to 4E are views showing a manufacturing step of a polarization element according to a first embodiment.

At this time, as shown in FIG. 4A, by providing a mask 116 between a sputtering target (film source) and the substrate, the metallic film 112a can be formed on the surface 111B of the substrate 111A and at the same time, the end portion of the metallic film 112a can have a forward tapered shape.

As a metal configuring the metallic film 112a, other than aluminum, for example, any of gold, copper, palladium, platinum, rhodium, silicon, nickel, cobalt, manganese, iron, chrome, titanium, ruthenium, niobium, neodymium, ytterbium, yttrium, thallium, molybdenum, indium, bismuth, and an alloy thereof, may be used.

Figure 3B:
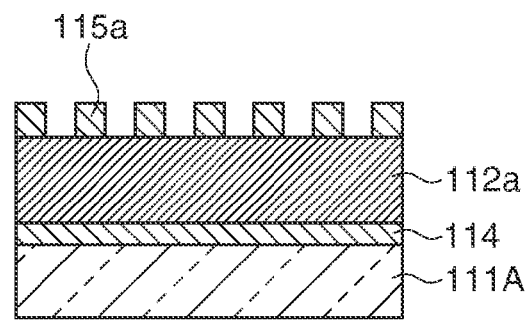
Figure 4B:
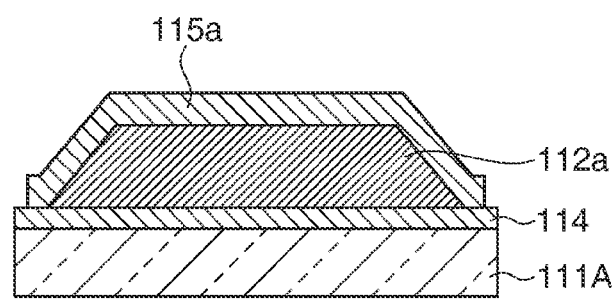

Next, in a resist forming step S2, a resist is applied onto the metallic film 112a by a spin coating, and is baked to form a resist film. After that, exposure and developing processing are performed and a resist 115a with a striped shape in a plan view is formed, as shown in FIGS. 3B and 4B. In detail, laser irradiation is selectively performed with respect to the resist film described above, so as to dispose the resist 115a to be formed with a striped shape. Since a pitch of the resist 115a to be formed is 140 nm in the embodiment, an interference exposure method, (dual beam interference exposure, in the embodiment) which is capable of forming a fine striped pattern equal to or less than a wavelength of visible light, is used. After performing such exposure, by performing baking (PEB: Post Exposure Bake) and extracting the exposure portion of the resist film by the etching, the resist 115a having a pattern shown in FIGS. 3B and 4B can be formed.

Figure 3C:
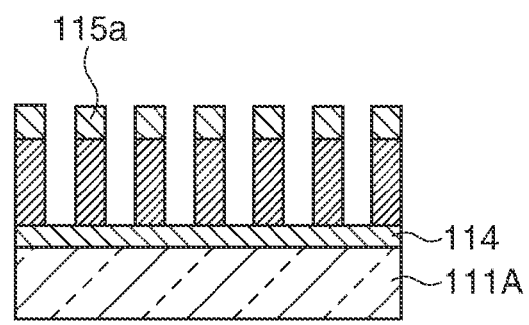
Figure 4C:
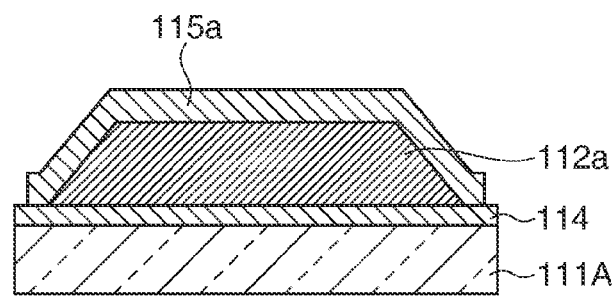

Then, in a pattern forming step S3, as shown in FIGS. 3C and 4C, the metallic film 112a is etched with the formed resist 115a as a mask.

Figure 3D:
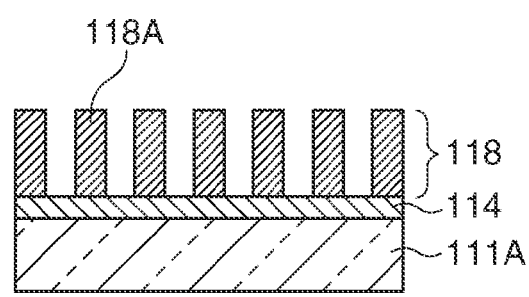
Figure 4D:
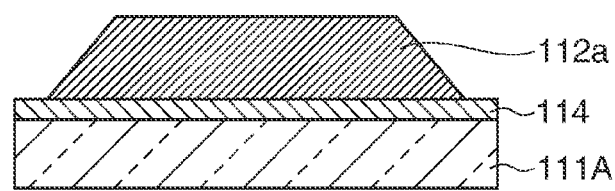
Figure 4E:
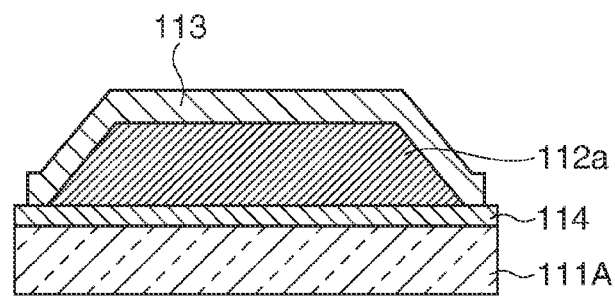

Further, in a resist removing step S4, by removing the resist 115a, the plurality of metallic thin lines 118A as shown in FIGS. 3D and 4D is formed and the wire grid polarization layer 118 is formed.

Figure 3E:
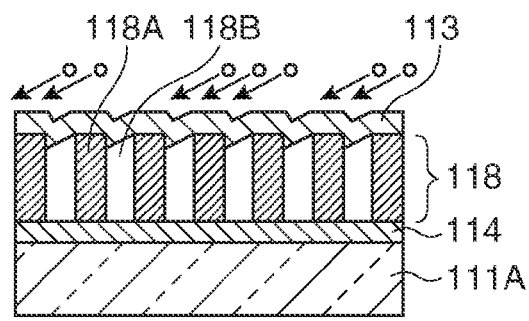

Finally, a protecting layer forming step S5 will be described in detail with reference to FIG. 3E. As shown by an arrow in FIG. 3E, the dielectric material is obliquely vapor-deposited so as to cover the upper surface of the metallic thin lines 118A and the upper side of the cavity portions 118B. In detail, the dielectric material is obliquely vapor-deposited from a direction which intersects with the extending direction of the metallic thin lines 118A and which is oblique with respect to the normal direction of the surface 111B of the substrate 111A. In the embodiment, the dielectric material is obliquely vapor-deposited from the Y axis direction when seen the substrate 111A from a plan view. Accordingly, the protecting layer 113 can be easily formed on the wire grid polarization layer 118 so that the cavity portion 118B is surrounded by the two metallic thin lines 118A which are adjacent to each other, the ground layer 114, and the protecting layer 113.

Figure 6:
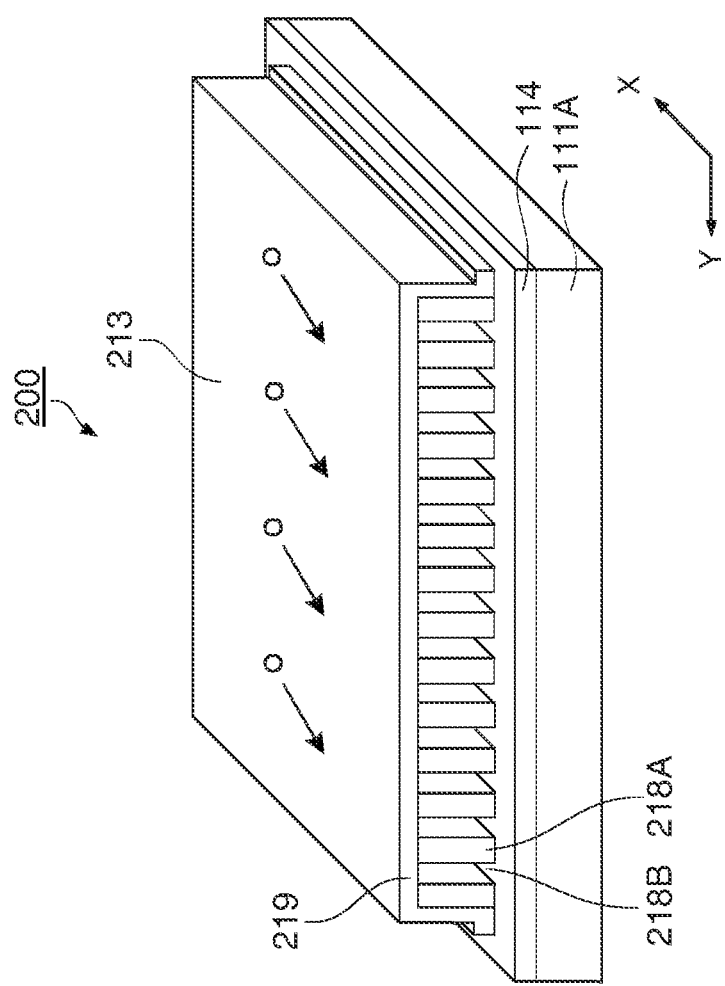
FIG. 6 is a view showing a polarization element of the related art.

Herein, a polarization element 200 of the related art is shown in FIG. 6. In the polarization element 200, end portions of the metallic thin lines 218A have vertical sectional shapes on the cross-section parallel to the extending direction (X axis direction) of metallic thin lines 218A. In a protecting layer 213, an upper surface of a flat portion 219 of the metallic thin lines 218A is covered by the protecting layer 213, to form obliquely from a direction parallel to a Y axis direction of FIG. 6, however, the end portions of the metallic thin lines 218A are not covered by the protecting layer 213. Accordingly, an opening portion of cavity portions 218B are provided on the end portions of the metallic thin lines 218A, and the cavity portions 218B are formed as spaces which are opened to the outside of the cavity portions 218B. Thus, the oxidization of the metallic thin lines 218A when the polarization element 100 is exposed to a high-temperature environment is difficult to suppress.

Meanwhile, according to the embodiment, the protecting layer 113 is continuously guided to the surface 111B of the substrate 111A from the upper portion of the plurality of metallic thin lines (protrusions) 118A and the upper side of the plurality of cavity portions 118B, through the end portion 120 having a forward tapered shape. Thus, the cavity portion 118B can be reliably sealed by the two metallic thin lines 118A which are adjacent to each other, the ground layer 114, and the protecting layer 113.

At this time, if the vapor-deposition method is used, for example, atmosphere gas in a deposition apparatus is hermetically filled by the protecting layer 113 in a state of being hermetically filled in the cavity portions 118B when forming a film. Accordingly, if the atmosphere gas is argon, argon may be hermetically filled or the air may be hermetically filled. Further, since the inside of the deposition apparatus is in a reduced pressure state, the inside of the cavity portions 118B is also set to be in a pressure reduction state. As described above, the cavity portion 118B, in which the gas such as the inactive gas is hermetically filled, is formed between the metallic thin lines 118A which are adjacent to each other.

By the steps described above, as shown in FIGS. 1A to 1D, it is possible to manufacture the polarization element 100 in which the plurality of metallic thin lines 118A and the plurality of cavity portions 118B in the space formed by the protecting layer 113 and the substrate 111A (ground layer 114) are provided.

By performing the process described above, it is possible to reliably form the cavity portion 118B which is surrounded by the two metallic thin lines 118A which are adjacent to each other, the substrate 111A, and the protecting layer 113. Accordingly, it is possible to easily form the polarization element 100 of a wire grid type, with a good extinction ratio (a transmittance ratio with respect to the polarizing component) and superior high temperature reliability.

Second Embodiment

Projector

Figure 7:
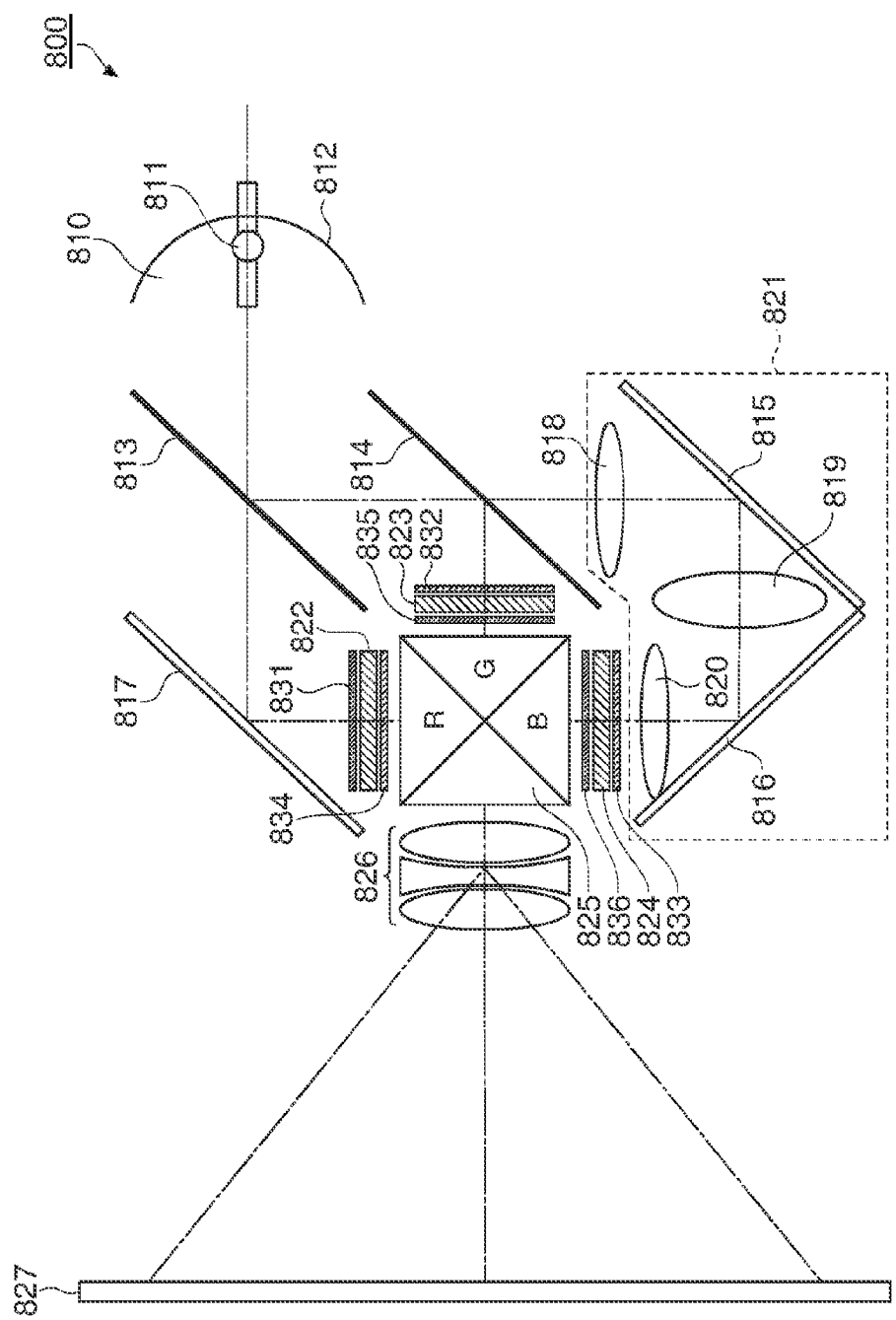
FIG. 7 is a schematic configuration view showing a projector according to a second embodiment.

FIG. 7 is a schematic configuration view showing main parts of a projector 800 including the polarization element according to the first embodiment. The projector 800 of the embodiment is a liquid crystal projector with a liquid crystal light modulating device used as a light modulating device.

The projector 800 includes a light source 810, a dichroic mirror 813, a dichroic mirror 814, a reflecting mirror 815, a reflecting mirror 816, a reflecting mirror 817, a light entering lens 818, a relay lens 819, a light emitting lens 820, a liquid crystal modulating device for red light 822, a liquid crystal modulating device for green light 823, a liquid crystal modulating device for blue light 824, a cross dichroic prism 825, a projecting lens 826, an entering side polarization element 831, an entering side polarization element 832, an entering side polarization element 833, an emitting side polarization element 834, an emitting side polarization element 835, and an emitting side polarization element 836.

The light source 810 is formed of a lamp 811 such as a metal halide, and a reflector 812 which reflects light from the lamp 811. As the light source 810, other than the metal halide, an extra high pressure mercury lamp, a flash mercury lamp, a high pressure mercury lamp, a Deep UV lamp, a xenon lamp, a xenon flash lamp or the like can be used.

The dichroic mirror 813 transmits red light included in white light from the light source 810, and reflects blue light and green light.

The transmitted red light is reflected by the reflecting mirror 817, and enters the liquid crystal light modulating device for red light 822 through the entering side polarization element 831. In addition, the green light reflected by the dichroic mirror 813 is reflected by the dichroic mirror 814 and enters the liquid crystal modulating device for green light 823 through the entering side polarization element 832. Further, the blue light reflected by the dichroic mirror 813 transmits through the dichroic mirror 814. In order to prevent light loss due to a long light path, a light guiding unit 821 which is formed of a relay lens system including the light entering lens 818, the relay lens 819, and the light emitting lens 820, is provided for the blue light. With the light guiding unit 821, the blue light enters the liquid crystal modulating device for blue light 824 through the entering side polarization element 833.

Each of the three colored light beams modulated by the light modulating devices 822 to 824 enters the cross dichroic prism 825 through each of the emitting side polarization elements 834 to 836. The cross dichroic prism 825 is obtained by joining four right-angled prisms, and a dielectric multilayer which reflects red light and a dielectric multilayer which reflects blue light are formed in an X-shape on the interfacial surfaces thereof. The three colored lights are combined by the dielectric multilayer and light for showing a color image is formed. The combined light is projected on a screen 827 by the projecting lens 826 which is an optical system for projecting, and an image is enlarged and displayed.

Herein, in the projector of the embodiment, the polarization element according to the first embodiment shown in FIGS. 1A to 1D is employed as the polarization elements 831 to 836. Since the light source 810 from the lamp 811 emits light with high energy, there is a concern that the organic material may be degraded or deformed due to the light with high energy. Therefore, the polarization elements 831 to 836 are configured by the polarization element including the wire grid polarization layer 118 formed of the metallic film with high light resistance and heat resistance.

In the embodiment, the three plate type projector has been described as an example; however, the polarization element according to the first embodiment can be applied to a projection type display apparatus or a direct-view type display apparatus of a single plate type.

Third Embodiment

Electronic Device

Figure 8:
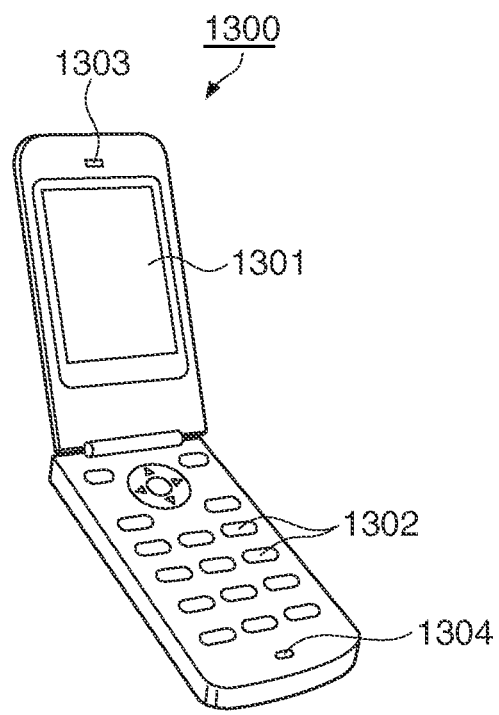
FIG. 8 is a schematic configuration view showing an electronic device according to a third embodiment.

FIG. 8 is a perspective configuration view of a mobile phone which is an example of an electronic device which includes the liquid crystal device including the polarization element according to the first embodiment as a display unit. A mobile phone 1300 includes the liquid crystal device as a small-sized display unit 1301, and includes a plurality of manual operation buttons 1302, an ear piece 1303, and a mouthpiece 1304.

The liquid crystal device is not limited to being used in the mobile phone, and can suitably be used as an image display unit such as an electronic book, a personal computer, a digital still camera, a liquid crystal television, a view finder type or a monitor direct-view type video tape recorder, a car navigation system, a pager, an electronic notebook, a calculator, a word processor, a workstation, a video phone, a POS terminal, a device including a touch panel, or the like, and it is possible to obtain a high brightness, a high contrast, transmission display and reflection display of a wide viewing angle, for any of the electronic devices.

The entire disclosure of Japanese Patent Application No. 2012-066922, filed on Mar. 23, 2012 is expressly incorporated by reference herein.

What is claimed is:
1. A polarization element comprising:
a plurality of metallic thin lines that extend in one direction on one surface of a substrate;
a protecting layer that is provided on the plurality of metallic thin lines; and
a cavity portion that is surrounded by two metallic thin lines which are adjacent to each other among the plurality of metallic thin lines, the substrate, and the protecting layer,
wherein each end portion of the plurality of metallic thin lines has a tapered shape in a cross-section parallel to the one direction, and
the protecting layer extends from an upper portion of the plurality of metallic thin lines to the one surface of the substrate through each end portion of the plurality of metallic thin lines.
2. The polarization element according to claim 1, wherein an oxygen concentration of the cavity portion is lower than an oxygen concentration of the portions of the polarization element outside the protecting layer.
3. A projector comprising the polarization element according to claim 2.
4. An electronic device comprising the polarization element according to claim 2.
5. The polarization element according to claim 1, wherein an inert gas is hermetically filled in the cavity portion.
6. A projector comprising the polarization element according to claim 5.
7. An electronic device comprising the polarization element according to claim 5.

8. The polarization element according to claim 1, wherein the plurality of metallic thin lines and the plurality of cavity portions are sealed by the protecting layer and the substrate.

9. A projector comprising the polarization element according claim 8.

10. An electronic device comprising the polarization element according to claim 8.

11. A projector comprising the polarization element according to claim 1.

12. An electronic device comprising the polarization element according to claim 1.

13. A method of manufacturing a polarization element including a plurality of metallic thin lines that extend in one direction on one surface of a substrate, a protecting layer that is provided on the plurality of metallic thin lines, and a cavity portion that is surrounded by two metallic thin lines which are adjacent to each other among the plurality of metallic thin lines, the substrate, and the protecting layer, wherein each end portion of the plurality of metallic thin lines has a tapered shape in a cross-section parallel to the one direction, the method comprising:

forming a metallic film on the one surface of the substrate;

forming a striped resist pattern on the metallic film;

etching the metallic film with the striped resist pattern as a mask to form the plurality of metallic thin lines; and forming the protecting layer on the plurality of metallic thin lines, wherein, in the forming of the metallic film, the metallic film is formed so that an end portion of the metallic film has the tapered shape, and in the forming of the protecting layer, the protecting layer is formed so that the cavity portion surrounded by the two metallic thin lines, the substrate and the protecting layer is formed.

14. The method of manufacturing a polarization element according to claim 13, wherein, in the forming of the protecting layer, the protecting layer is obliquely vapor-deposited from a direction which intersects with the one direction and which is oblique with respect to a normal line of the one surface of the substrate.

15. The method of manufacturing a polarization element according to claim 13, wherein, in the forming of the metallic film, the metallic film is vapor-deposited on the one surface of the substrate with the mask that is provided between a film source and the substrate so that the end portion of the metallic film has the tapered shape.

* * * * *